United States Patent
Davies

(10) Patent No.: US 6,256,670 B1
(45) Date of Patent: Jul. 3, 2001

(54) ALARM SERVER SYSTEMS, APPARATUS, AND PROCESSES

(75) Inventor: Stephen W. Davies, Cedar Park, TX (US)

(73) Assignee: Netsolve, Inc., Austin, TX (US)

( * ) Notice: Subject to any disclaimer, the term of this patent is extended or adjusted under 35 U.S.C. 154(b) by 0 days.

(21) Appl. No.: 09/541,866

(22) Filed: Apr. 3, 2000

Related U.S. Application Data

(63) Continuation of application No. 09/032,408, filed on Feb. 27, 1998, now Pat. No. 6,058,420.

(51) Int. Cl.[7] .................................................. G06F 13/00
(52) U.S. Cl. ............................................................ 709/224
(58) Field of Search ................................... 709/200, 201, 709/203, 217, 218, 219, 220, 221, 223, 224

(56) References Cited

U.S. PATENT DOCUMENTS

| | | | |
|---|---|---|---|
| 5,309,564 | * 5/1994 | Bradley et al. | 709/208 |
| 5,911,038 | 6/1999 | Jones | 710/20 |
| 5,935,252 | 8/1999 | Berglund et al. | 710/104 |
| 6,085,019 | * 7/2000 | Ito et al. | 386/52 |

* cited by examiner

Primary Examiner—Moustafa M. Meky
(74) Attorney, Agent, or Firm—Worsham Forsythe Wooldridge LLP

(57) ABSTRACT

A system used to manage a network by monitoring at least one interface of the network comprises a poller, a server, and a database, all in communication with one another. The poller continuously checks the at least one interface of the network by continuously sending out a poller query message to at least one interface of the network. The poller suspects a first interface of at least one interface of failing when the poller does not receive a poller reply message in response to the query messages from the first interface within a first time period. The poller sends an alert signal to the server notifying the server that the first interface of the at least one interface may be failing when the poller suspects the first interface of the at least one interface is failing. After receiving the alert signal the server sends out at least one server query signal to the first interface, the server monitors the response to determine whether the first interface replies to at least one server query signal by sending at least one server replay message. The server evaluates at least one server replay message to determine whether the first interface is failing. The database contains information concerning at least one interface of the network. When the server determines the first interface is failing, the server pulls first information concerning the first interface and sends an alarm signal with the first information to client applications modules. A process to monitor at least one interface on a network comprises the following steps: (a) continuously sending Get Requests to at least one interface; (b) monitoring any first replies received from at least one interface to the Get Requests to determine whether a reply is received at a first time from each interface of at least one interface; (c) sending an alert message to a server, if a reply is not received from a first interface of at least one interface; (d) sending at least one server query to the first interface by the server; and (e) monitoring any second replies received from the first interface in response to at least one server query by the server to determine whether the first interface has failed.

58 Claims, 14 Drawing Sheets

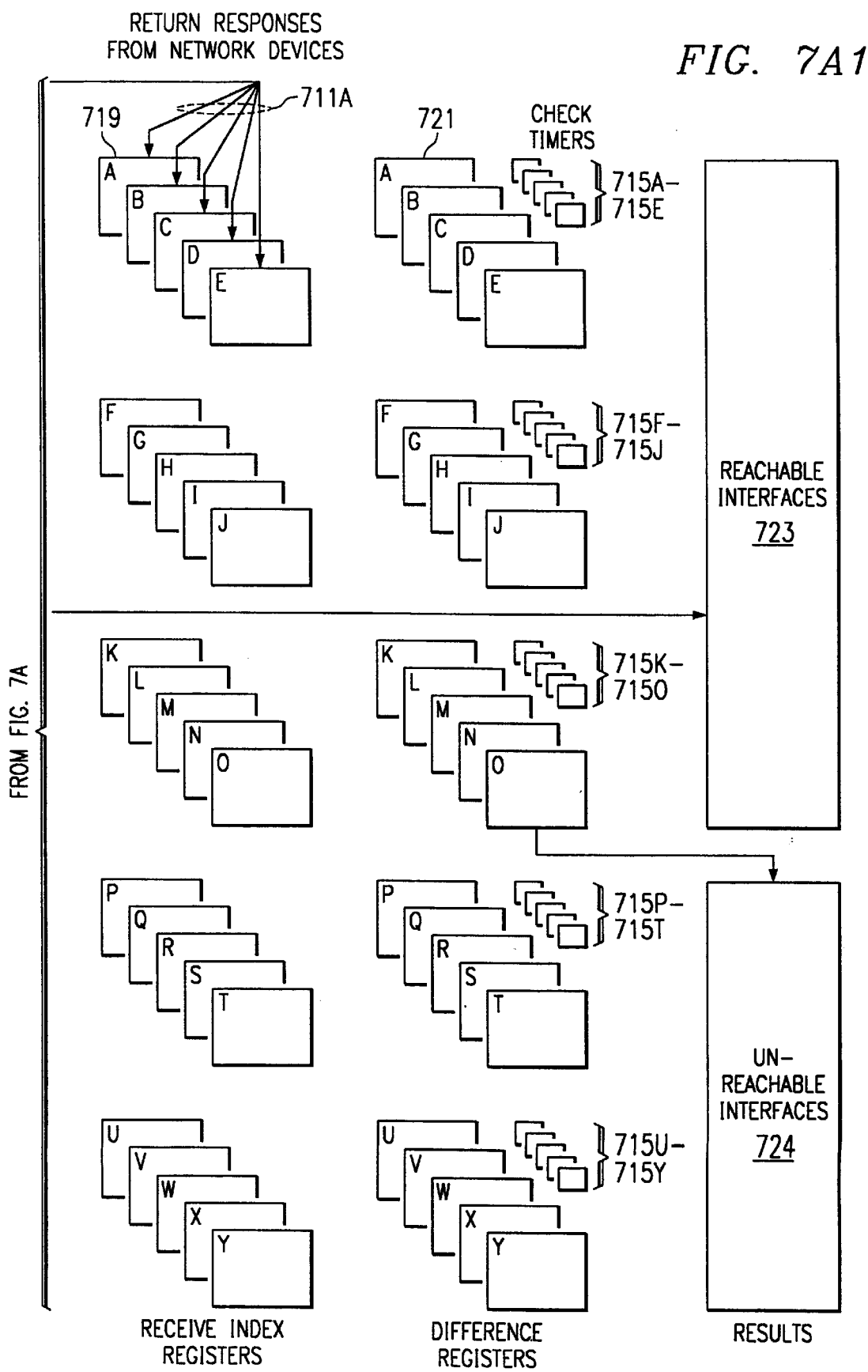
FIG. 7A1

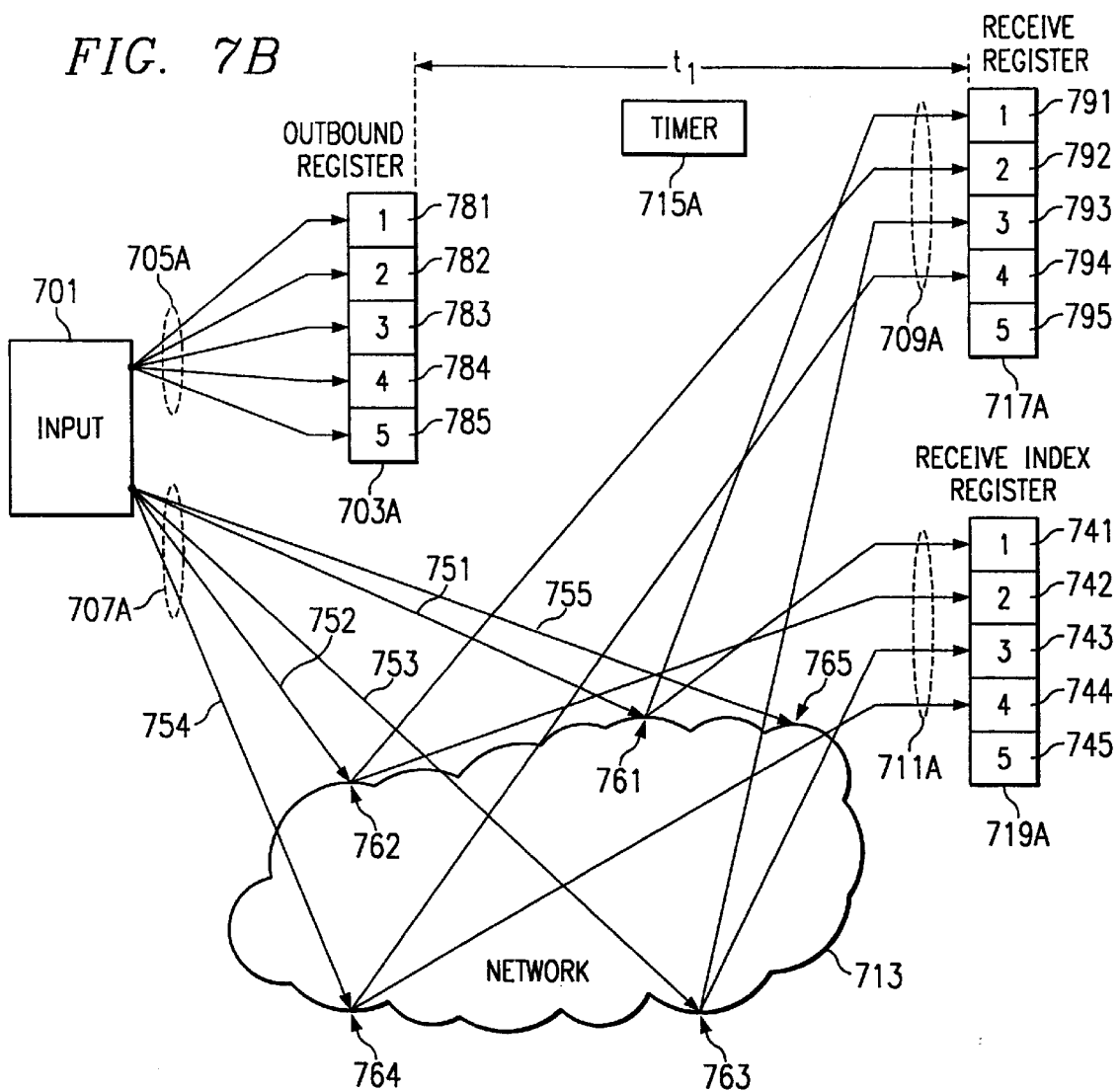
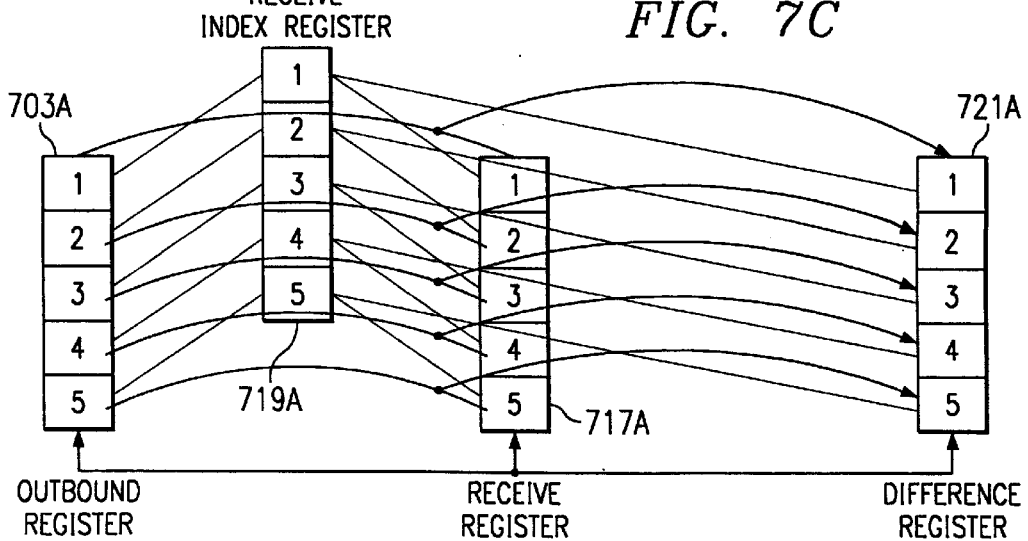

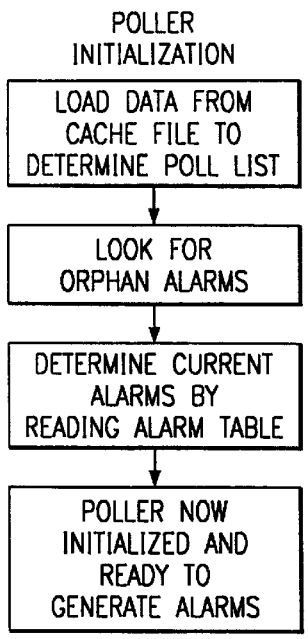
FIG. 9A
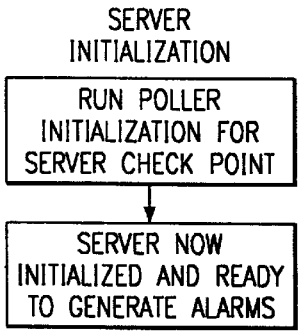
FIG. 9B
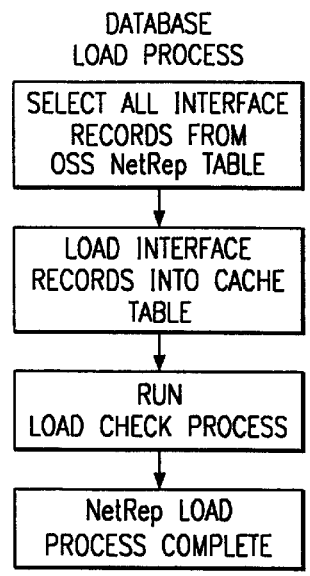
FIG. 9C
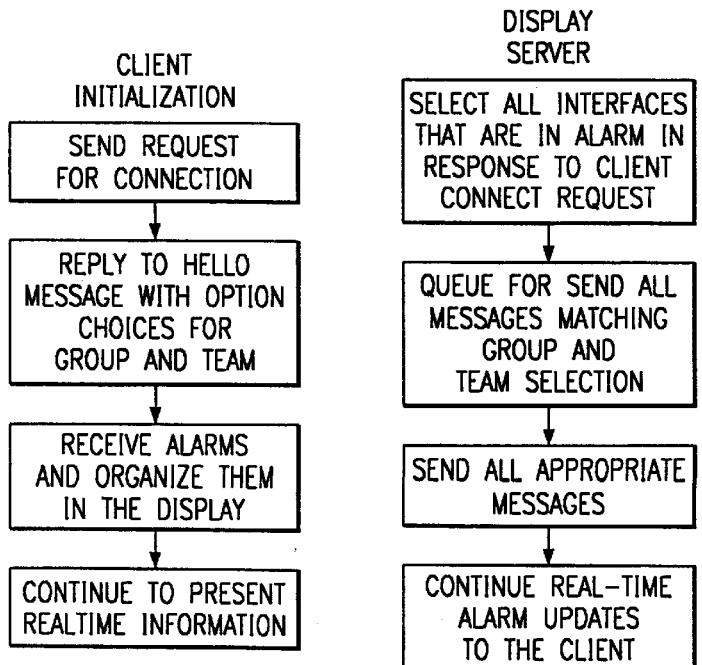
FIG. 9D
FIG. 9E

ALARM SERVER SYSTEMS, APPARATUS, AND PROCESSES

CROSS-REFERENCE TO RELATED APPLICATIONS

This application is a continuation application under 35 U.S.C. §120 and claims priority from U.S. patent application Ser. No. 09/032,408, entitled Alarm Server Systems, Apparatus, and Processes, named Stephen W. Davies as inventor, filed Feb. 27, 1998, now U.S. Pat. No. 6,058,420, and such prior application shall be considered part of this application.

FIELD OF INVENTION

The present invention generally relates to management platforms used to manage multiple customer networks and specifically, to processes, apparatus, and systems used to construct management platforms consistent with Simple Network Management Protocol ("SNMP") to manage multiple customer networks.

BACKGROUND

Existing network management tools, such as Hewlett Packard's Open View Network Node Manager ("HP's NNM"), utilize graphical displays of network components and generally utilize color to relay information. These systems are generally used to manage and control networks, in which they generally provide notification of the status of network elements, particularly, failed elements. Networks are generally comprised of computer communications equipment, including, but not limited to, routers, switches hubs, and servers. HP's NNM can be viewed as being representative of the architecture and approach used by current commercial network management tools and, thus, is used herein to explain some of the problems with existing approaches.

These existing network management tools have a number of problems. Specifically, the displays are not helpful. Since color (shown as varying grey shades in FIGS. 1 and 2) is used to relay information, alarms can be hidden by an inappropriate color change threshold. In particular, as shown in FIGS. 1 and 2, HP's NNM maps use shapes that represent collections or managed objects. As shown in FIGS. 1 and 2, each object can be 'exploded' by opening the object until the lowest level is reached. Each aggregate object can have only one (1) of six (6) colors to represent the number of elements grouped together in that aggregate object that are in alarm condition, the color of the aggregate object being determined on a fractional basis Consequently, in certain circumstances, HP's NNM maps fail to communicate the occurrence of an alarm, as the presentation mechanism fails to relay the information to the user of the system in a way that makes the new failure apparent. For example, it may require the user to open additional windows, which, at a certain point, becomes impractical. At the aggregate object layer, as shown in FIGS. 1 and 2, the overall color of the aggregate object may not actually change color, even though individual elements of a specific aggregate object may fail.

Specifically, FIG. 1 is a typical view of an application of HP NNM, as it appears on an engineer's monitor, with one alarm and FIG. 2 is a typical view of an application of HP NNM, as it appears on a computer monitor, with multiple alarms. It is difficult to track the number of alarms in both FIGS. 1 and 2, especially in FIG. 2. The upper let-hand sub-window, which is labeled "IP Internet," has not changed colors (or grey shades) in between FIGS. 1 and 2, which illustrates how changes can be hidden. The color level did not change with the additional alarm, due to the number of objects represented below the "IP Internet" symbol (shown in the sub-windows below) that were not in an alarm condition. Since these maps can be many levels deep, this problem can occur at any level. Additional sub-windows must be opened to avoid the averaging problem, which makes the overall display extremely crowded. Similarly, new alarms in existing systems can be hard to see or detect. Even if the change of status in an individual element does, in fact, change the color of the aggregate object, the change in color can be hard to detect on the display. For example, displays used in these modem systems are typically filled with numerous colored objects and the operator may not notice one more colored icon.

Also, information displayed by modem systems are difficult to relate or otherwise view. Particularly, the objects used in these modem systems are capable of relating only a limited amount of textual data. For instance, please refer to FIGS. 3 and 4. FIG. 3 is a typical view of HP's NNM, as it appears on a computer monitor, showing external data capabilities. FIG. 4 is a typical view of HP's NNM, as it appears on a computer monitor, showing internal data capabilities. A right dick via a standard mouse on a symbol will bring up a menu of options, one of which is to view/modify the object description, but not the relative size of the comments section. This dialog box presents an opportunity to record some relevant external information about the symbol that is reporting the alarm, but, unfortunately, the opportunity is effectively wasted, since it is extremely difficult and time consuming to enter each field by hand and only one or two pieces of information can be shown at a time. For each device, several entries would be required and there may be 1000's to 100,000's of devices. Typically, the label for an object is generated by the HP's NNM application and is indicative of some data internal to HP's NNM and is not related to any external data such as city name or device name.

Furthermore, applications using existing systems are difficult to administer, as the preferred tools are complex and typically require specialized training just to operate the tool. Moreover, scalability is questionable and expensive, as there is a limit to the size of network that HP's NNM can manage, and even for small networks (<500 sites) the hardware and software licenses are expensive. Finally, modem systems are slow and limited in the total number sites that can be reviewed. For instance, actual embodiments of NNM has not been shown to work reliably for more than 500 sites. Actual embodiments of HP's NNM took from fifteen (15) minutes to hours to display information about failed devices and stopped functionally about once a week.

Existing designs and procedures have other problems as well.

SUMMARY

Preferred embodiments pertain to an apparatus and related methods and systems that generally manage networks. Note that preferred methods are preferably performed by the preferred apparatus and systems and are discussed in reference to the preferred apparatus and systems.

Preferred embodiments generally implements the following procedure to operate preferred systems: (i) the SNMP Poll application loads from a database a list of interfaces to be monitored; (ii) the SNMP Poll sends out SNMP and tracks responses to determine which interfaces are reachable and which are not; (iii) if the SNMP Poll fails to reach an interface two (2) consecutive times, a message is sent to server; (iv) the server checks the interface for a total of ten (10) more times and, if the interface replies six (6) or fewer times to the ten (10) requests, an alarm is generated, and, if the interface replies seven (7) or more times to the ten (10) requests, a message is sent back to the SNMP Poll and the interface is placed in the poll queue; (v) the server generates an alarm, if necessary, by associating information from the OSS database with the interface address; (vi) the server distributes the alarm by sending an alarm message to all attached display devices (e.g., a display server and client); (vii) a client can display the alarm information in a hierarchical tree structure; and (viii) the server monitors the interface to determine when the interface become reachable again and generates a clear message which is formatted and sent to the clients and the server then sends a message to the SNMP Poll to return the interface to the poll queue.

Preferred embodiments are used to manage a network by monitoring at least one interface of the network and are generally comprised of a poller, a server, a database, and a client applications module. The poller, server, database, and client applications module are in communication with each other. The poller is in communication with at least one interface of the network. The poller continuously checks at least one interface of the network by continuously sending out a poller query message to at least one interface of the network. The poller sends out the poller query messages to at least one interface in a regular, continuous manner. The poller monitors the responses, if any, received from at least one interface to the poller query message. The poller suspects a first interface of the at least one interface of failing when the poller does not receive a poller reply message in response to the query messages from the first interface within a first time period. The poller continues to monitor the first interface to determine if and when the first interface becomes reachable again and the poller generates a clear message to the server which is formatted and sent to clients and the server then sends a message to the poller to restart sending the poller query messages to the first interface.

The poller sends an alert signal to the server notifying the server that the first interface of at least one interface may be failing when the poller suspects the first interface of the at least one interface is failing. After receiving the alert signal, the server sends out at least one server query signal to the first interface, which the server monitors to determine whether the first interface replies to at least one server query signal by sending at least one server replay message. The server sends out the poller query messages to at least one interface in a regular, continuous manner. The server evaluates at least one server replay message to determine whether the first interface is failing by sending out a first number, such as ten (10), of the server query signals to the first interface and further wherein the server determines whether the first interface is failing by counting the poller responses received and if the poller responses are above a minimum number, such as seven (7), then the server determines that the poller must be failing.

The database contains information concerning at least one interface of the network. When the server determines the first interface is failing, the server pulls first information concerning the first interface and sends an alarm signal with the first information to client applications modules. The database also stores alarm information comprised of information about the alarm signal and the server stores the alarm information about the alarm signal in the database.

The server communicates with the client applications module via a display server, the display server receives the alarm signal and the alarm information, organizes the alarm information, and presents the alarm signal and the alarm information to the client applications module. The client applications module displays the alarm information in a hierarchical tree structure.

Preferred embodiments provide a number of advantages. With respect to the operation of the preferred embodiment, preferred embodiments adopt or utilize a distributed architecture, which can be extended over several machines and multiple processors. Preferred embodiments also utilize parallel operation of various features and functions, so that multiple, parallel outbound queues can be used to optimize polling efficiency. Specifically, preferred embodiments are able to effectively touch or access every interface in a customer base in less than one (1) minute, allow a maximum of 1250 simultaneously outstanding requests, poll at a rate of up to 120 interfaces per second per SNMP machine. Preferred embodiments adopt randomized outbound polling, so as to provide even loading to customer/carrier networks. Preferred embodiments are easily integrated with a database (i.e., Oracle™ Database) and can adopt a client-server model and can be used with multiple clients. Preferred embodiments are scalable, such that preferred embodiments are cable of monitoring many systems and many customers simultaneously. The architecture of preferred embodiments allows for multiple SNMP polling machines and allows an extended interval (i.e., 8000 ms) for return of a response. Preferred embodiments run on a 'low level' hardware platform. Preferred embodiments allow updates of the underlying database, while the system is in operation. In contract to currently available commercial applications, preferred embodiments are functionally focused providing maximum performance in a narrow functional area. Preferred embodiments make the first call in reference to the loss of contact and then pass those locations to a separate Investigation Queue.

With respect to the presentation provided by preferred embodiments, an alarm is generally viewed as a notification that something is broken. Consequently, preferred embodiments associate an alarm condition with other pertinent information, such as the physical address of the device in addition to its network address and contact information, such as telephone numbers and names of local operators. This information is presented in two (2) ways: (i) in a hierarchical tree structure to relay the current state of the entire 'managed network space' and (ii) in a table structure to relay an historical view that describes a recent event. As a result, the presentation found in preferred embodiments are convenient and timely. For example, preferred embodiments provide the following types of information: (i) "Spring" to determine connectivity; (ii) "Squery" to gather basic SNMP statistics; (iii) "Dynamic Un-Manage" to un-manage a client interface; (iii) "Dynamic Re-Manage" to add an interface to the managed list; (iv) "Automated NetRep Load" to load the database; (v) "Interface Reports" to determine extent of managed devices; (vi) "Event Reports" to summarize activity by site, customer, and date range; (vii) "On Demand Statistics" to manage interfaces, sites by Group and Team; (viii) "2 Part Display" to show hierarchical and historical information pertaining to the network; (ix) "Team Delivery of Alarms" to allow a user to choose a view a team and/or group; (x) "Control Events" to automatically un-manage and subsequently re-manage network interfaces at pre-specified times; and (xi) "Display Server" to relay messages between multiple client applications and server applications, as it shares the load and relieves the server of some of the communications tasks. Display servers used in preferred embodiments allow the connection of sixteen (16) clients per display server and a total of approximately 128 clients or more. The architecture also allows fewer resources on the server than on an architecture having all clients attached directly to the server.

Other advantages of the invention and/or inventions described herein will be explained in greater detail below.

BRIEF DESCRIPTION OF THE DRAWINGS

The accompanying drawings are incorporated into and form a part of the specification to illustrate several examples of the present inventions. These drawings together with the description serve to explain the principles of the inventions. The drawings are only for the purpose of illustrating preferred and alternative examples of how the inventions can be made and used and are not to be construed as limiting the inventions to only the illustrated and described examples. Further features and advantages will become apparent from the following and more particular description of the various embodiments of the invention, as illustrated in the accompanying drawings, wherein:

FIGS. 7A, 7A1, 7B, 7C, 7D, and 7E are overviews of the process preferably used;

FIGS. 9A–9E are flow charts showing the initialization procedure for poller modules 503A and 503B, server module 501, database module 506, client applications modules 505A–505F and 505G–505L, and display server modules 504 in FIG. 5;

DETAILED DESCRIPTION

Figure 1:
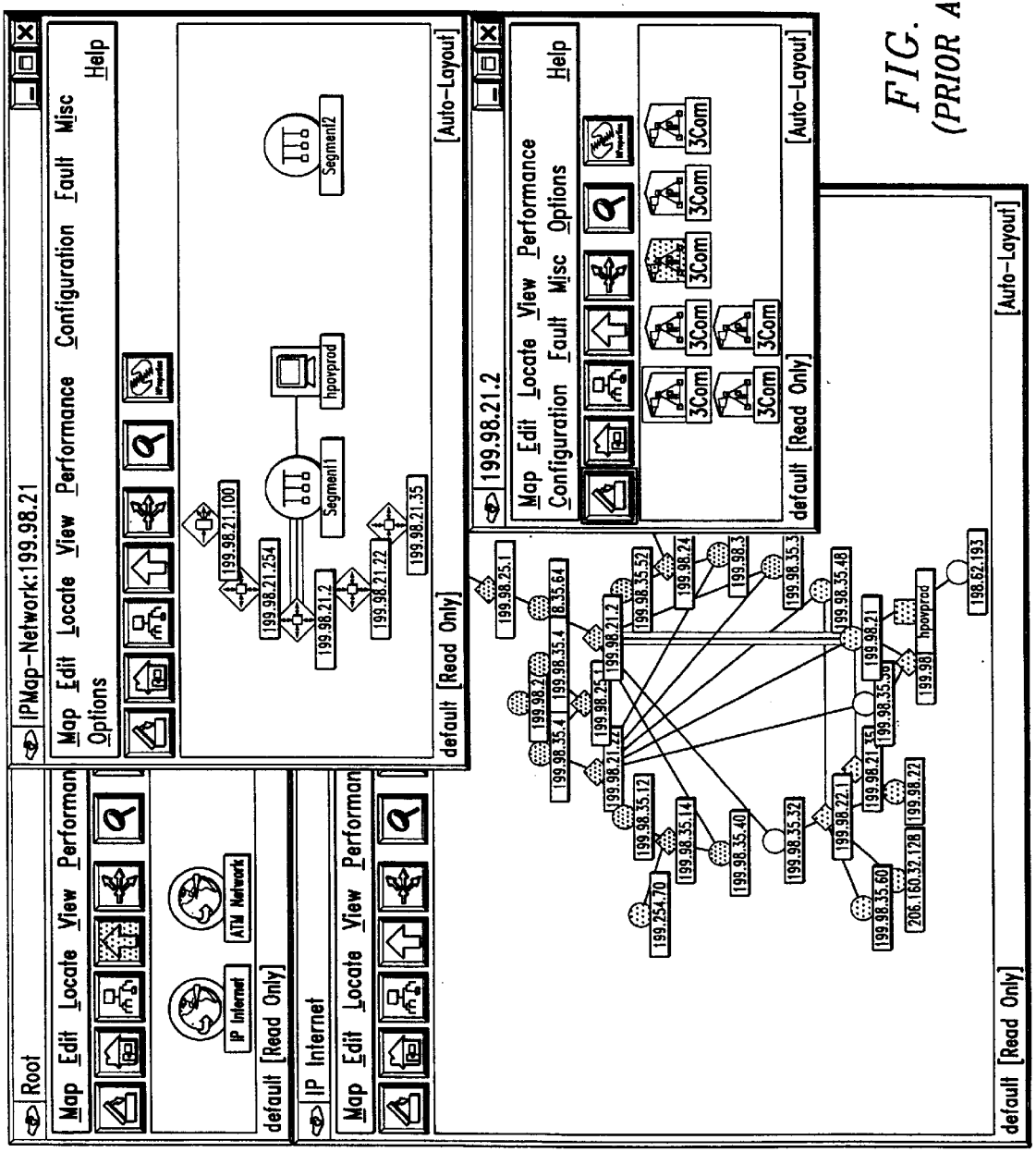
FIG. 1 is a typical view of an application of HP NNM, as it appears on an engineer's monitor, with one alarm.
Figure 2:
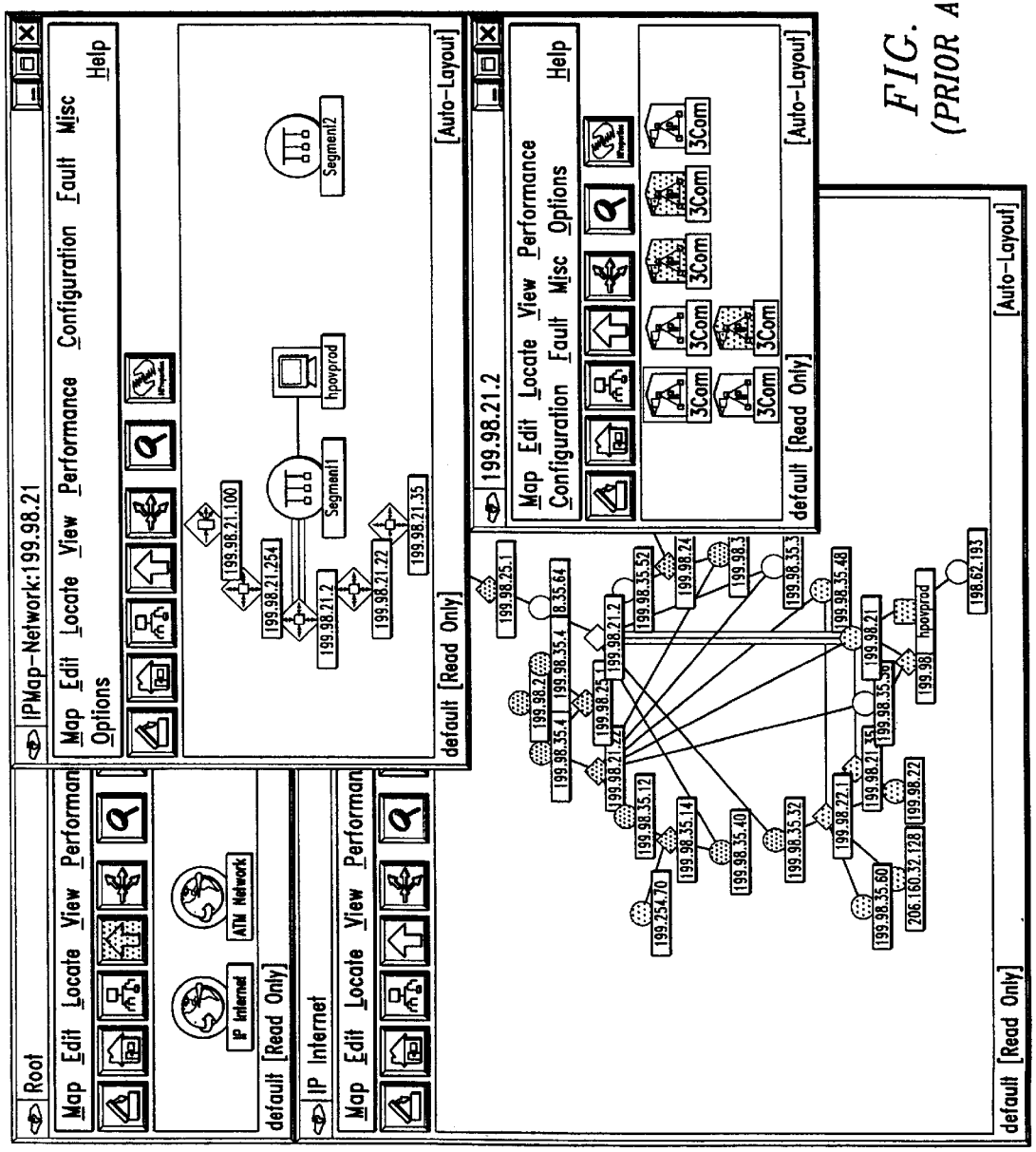
FIG. 2 is a typical view of an application of HP NNM, as it appears on a computer monitor, with multiple alarms.
Figure 3:
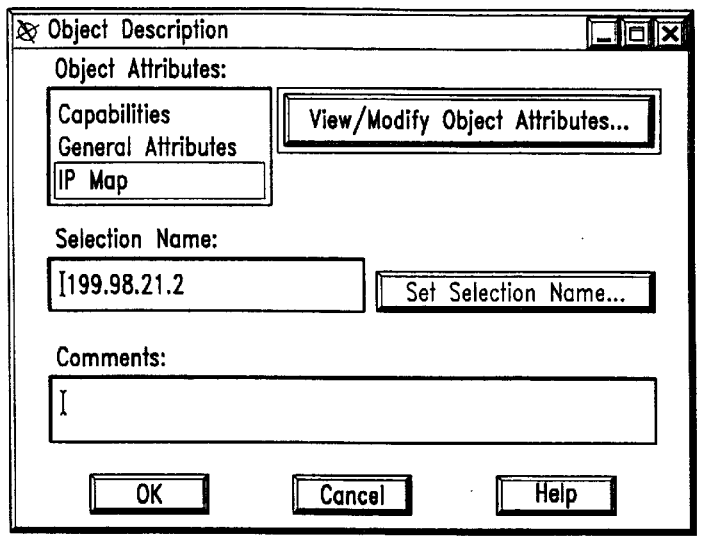
FIG. 3 is a typical view of HP's NNM, as it appears on a computer monitor, showing external data capabilities.
Figure 4:
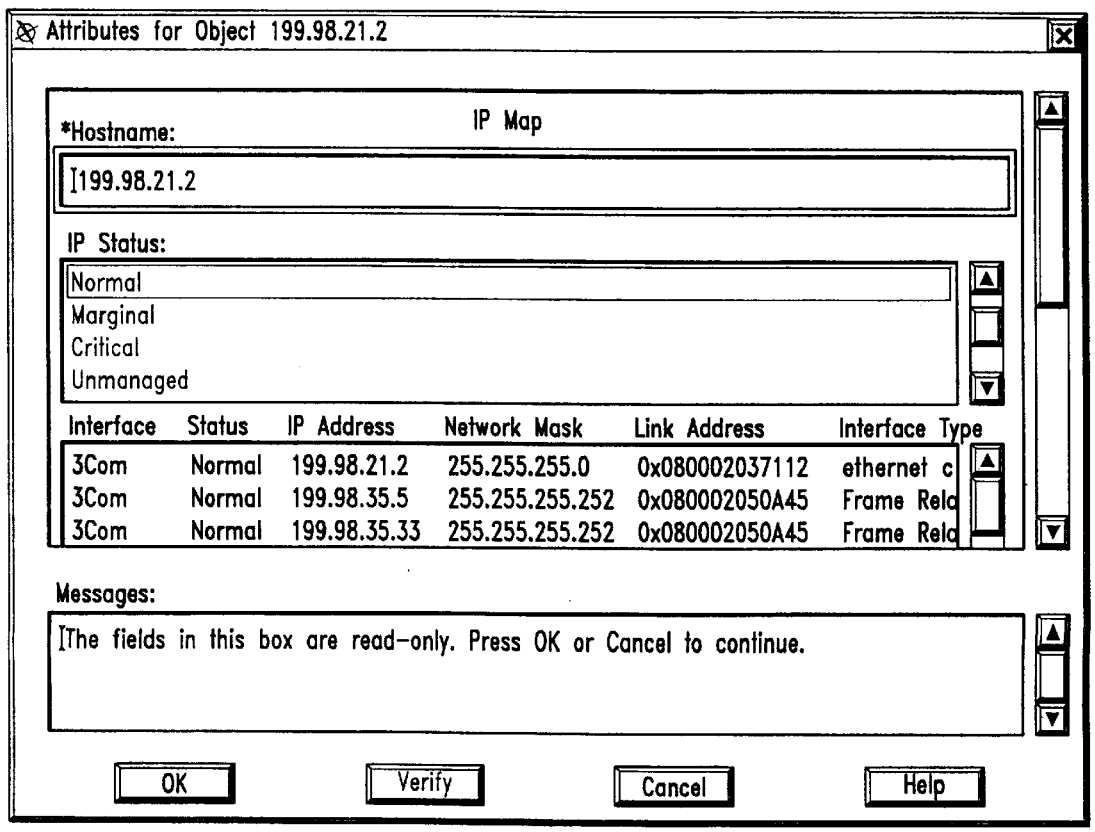
FIG. 4 is a typical view of HP's NNM, as it appears on a computer monitor, showing internal data capabilities.

The present inventions will be described by referring to apparatus and methods showing various examples of how the inventions can be made and used. When possible, like reference characters are used throughout the several views of the drawing to indicate like or corresponding parts.

System Topology and Process Overview

Figure 5:
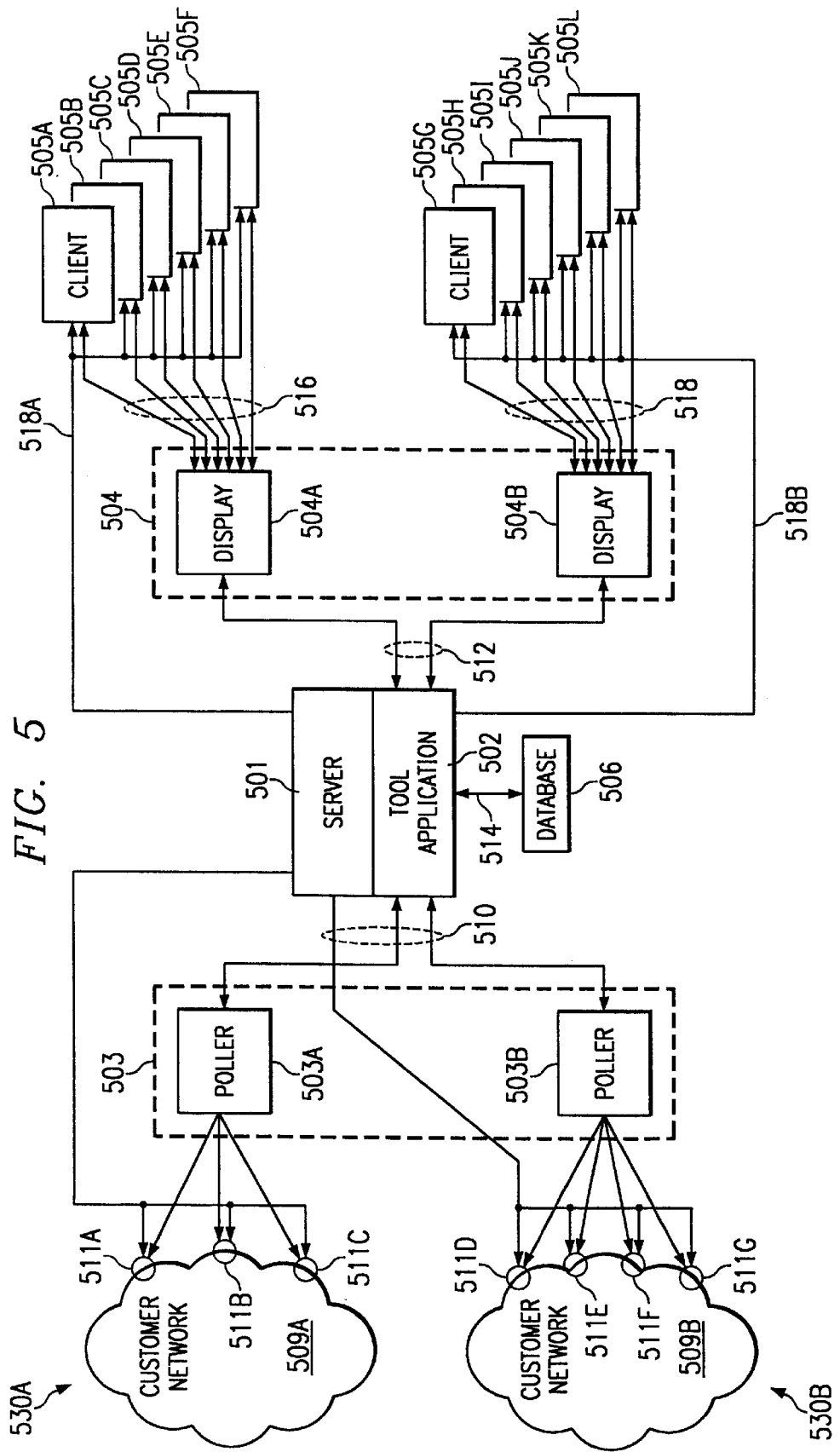
FIG. 5 is an overview of a system topology of a preferred embodiment.

Preferred embodiments employ a distributed architecture to achieve high performance on relatively inexpensive hardware. All of the components preferably operate or run on a platform operated by Windows NT™ or Windows 95™. A topology overview of a preferred embodiment is shown in FIG. 5 and is generally comprised of the following system components: server application module 501, tools applications module 502 (which is shown in FIG. 5 as being combined with the server application module 501), poller module 503 (which is shown broken into two (2) poller modules 503A and 503B, display server module 504 (which is shown broken into two (2) display modules 504A and 504B), client applications modules 505A–505F and 505G–505L, and database module 506. The limitations on the number of the above components are as follows: one (1) server application, one (1) tools application, eight (8) pollers, sixteen (16) display servers and 256 clients. In addition, note the preferred embodiment includes a collection of applications that make up the server function, whereas the term "server application" refers to a single application. FIGS. 9A–9E are flow charts showing the initialization procedure for poller modules 503A and 503B, server module 501, database module 506, clients 505A–505F and 505G–505L, and display server modules 504 in FIG. 5 and are self explanatory.

Poller modules 503A and 503B are in communication with server module 501 and tools applications module 502 via communication links 510. Server module 501 and tools applications module 502 are in communication with database module 506 via communication link 514. Server module 501 and tools applications module 502 are in communication with display module 504A and 504B via communication links 512. Display module 504A is in communication with client applications modules 505A–505F via communication links 516; display module 504B is in communication with client applications modules 505G–505L via communication links 518. Server module 501 and tools applications module 502 is also in direct communication with client applications modules 505A–505F via communication links 518A and server module 501 and tools applications module 502 are also in direct communication with client applications modules 505G–505L via communication links 518B. Note poller module 503A polls at least one interface on customer network 530A and poller module 503B polls at least one interface on customer network 530B.

Figure 8:
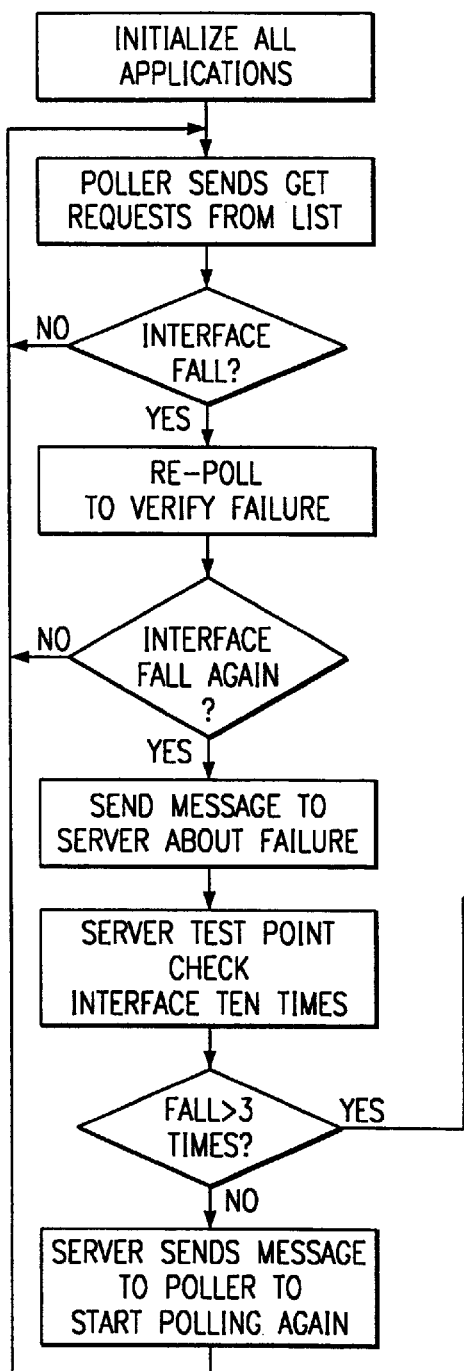
FIG. 8 is a flow chart of a preferred process generally implemented by the system topology shown in FIG. 5.
Figure 8:
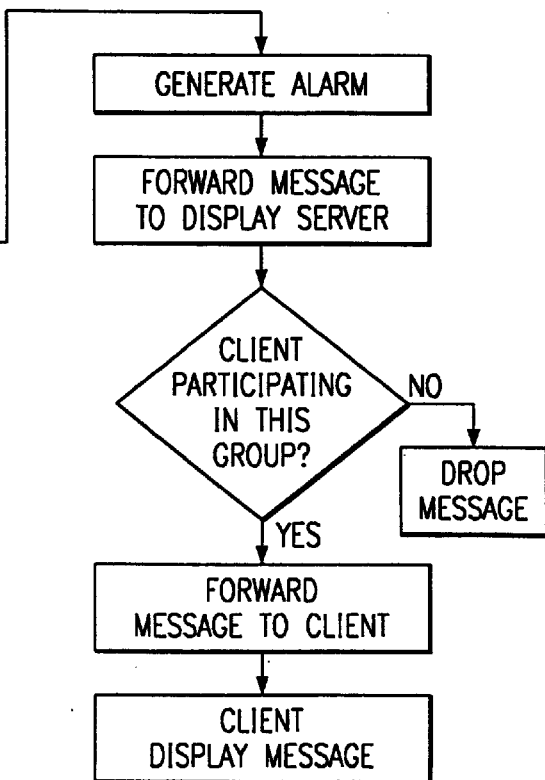

Referring to process shown in FIG. 8, all of the modules shown in FIG. 5, including server module 501, tools applications module 502, poller module 503, display modules 504A and 504B, client applications modules 505A–505F and 505G–505L, and database module 506 are initialized, using the procedures shown in FIG. 9A–9E. Particularly, referring to FIG. 6A, each polling module 503A and 503B loads the SNMP Poll application from database module 506, which includes a list of interfaces 511A–511C and 511D–511G to be monitored on customer networks 509A and 509B, which is referred to as the polling queue. Polling modules 503A and 503B send Get Requests, such as Get Request 621 shown in FIG. 6A, and, if an interface failure as detected, which is usually indicated by the absence of a response, polling modules 503A and/or 503B repolls the interface suspected of failing by resending a Get Request. In so doing, polling modules 503A and/or 503B track responses to determine which interfaces are reachable and which are not and, if polling modules 503A and/or 503B fail to reach an interface two (2) consecutive times, a message is sent to server module 501. Then, server module 501 checks the interface for a certain number of additional times, such as for a total of ten (10) more times, and, if the interface replies a certain number of times, such as six (6) or fewer times, to the total number of requests, server module 501 generates an alarm, and, if the interface replies seven (7) or more times to the ten (10) requests, a message is sent back to specific polling modules responsible for polling that interface and the specific interface suspected of failure is placed in the poll queue. The poll queue is the current listing of interfaces 511A–511C and 511D–511G on networks 509A and 509B, which is stored in database module 506 and accessed with toll application module 502 and transferred to server module 501 and then to poller module 503. Server module 501 also generates an alarm, if necessary, by associating information received from database module 506 with the interface address. Server module 501 distributes the alarm by sending an alarm message via display modules 504A or 504B to the appropriate client applications modules 505A–505F or 505G–505L. Client applications modules can display the alarm information in a hierarchical tree structure shown in FIG. 10B. Server module 501 monitors the interface to determine when the interface become reachable again and generates a dear message which is formatted and sent to the clients and the server then sends a message to the SNMP Poll to return the interface to the poll queue.

Client applications modules 505A–505F and 505G–505L are not actual "clients," but rather refer to a particular instance of a software application in which the overall architecture of a preferred embodiment with which it interacts, namely a client-server application. A client-server application is a special type of architecture wherein certain functions are performed at or by the client-server application, namely client applications modules 505A–505F and 505G–505L, and other functions are performed at the server application (or collection of server applications) on server 501. "Client" does not in any way refer to a customer or a customer's network.

Communication Formats

Three (3) modes of communication are used among the individual components: (i) Internet Protocol ("IP") Datagrams (User Datagram Protocol("UDP") and Transition Control Protocol("TCP")); (ii) File System Access; and (iii) Open DataBase Connectivity ("ODBC") Connections. IP is a widely used communications protocol defined by the Internet Engineering Task Force ("IETF") in one or more Requests for Comment ("RFC"), which is IETF's vehicle for publishing standards. IP also includes UDP and TCP, which are two additional protocols defined by IETF RFC's. In general, communications systems are described by a seven (7) layer model that resembles the definition for communications protocol stack used by Open Systems Interconnect ("OSI"), which is another standards body. A communications protocol stack is a collection of software layers that together enable computer applications to communicate. Each layer of the stack is responsible for certain features. UDP and TCP are layer 4 definitions. IP is a layer 3 definition. UDP and TCP packets 'ride' inside an IP datagram. Thus, messages 'ride' in TCP and UDP packets. Note that it is not necessary to utilize all seven (7) layers in a given application. The content of IP datagram messages are unique to this application. The general format of a message is "command=value" where Command is one of several commands defined in the communications architecture and Value is an attribute, such as an IP address or the attributes of an alarm. In some instances, Value can be a sub-message in that Value may be another message such as "command=value." In addition, in some instances, Value can be a sub-message in that Value may consist of "AttributeName=AttributeValue."

Examples of messages are as follows:
"InsertDown=885576; Major; Feb. 11, 1998; 09:57:10; 199.165.168.129; 255.255.255.192; Node dropped 100% of requests.; 14435; STANDARD TITLE COMPANY; DENVER, CO.; mjp; O; New; 503248-2483; 1000; 1000; 22922; 38639; PW4;; Alarm;;;"

"UpdateAcknowledgeAlarm=875513:mjp',
in which the following information is contained
""message"; "problem"; "date"; "time"; "IP address"; "IP mask"; "message"; "customer ID"; "customer name"; "customer location"; "name of operator"; "type of alarm"; "place number"; "code"; "circuit identification"; "gate identification"; "product name"; "alarm type";;;"

"command"="identification number of a record in database having an alarm to be acknowledged"

All of the communication links shown in FIG. 5, including communication links 510, 512, 514, 516, 518, and 518A and 518B, utilize IP protocol to varying degrees.

Preferred embodiments use Microsoft™ Access™ file format and use the Microsoft™ Data Access Objects ("DAO") engine for data retrieval from database module 506. This mechanism is designed to function on a local machine and as such retrieves data as though it were on the local disk. When the file is moved to a separate machine, as in the implementation of the preferred embodiment, the DAO engine relies on a file system networking layer to make the file appear local to the client machine. Communication links 510, 512, 516, and 518A and 518B utilize the File System Access protocol.

As stated above, ODBC communications are standard and are defined in ODBC reference information. Since preferred embodiments utilize Oracle Database products to implement database module 506. Preferred embodiments preferably use Oracle SQL*Net TCP/IP adapter for the ODBC Connections. ODBC is a common software layer designed for database access. So, communication link 514 utilizes ODBC protocol. Database module 506 is sometimes called "NetRep."

Port Usage and Data Access and Equipment Configuration

Figure 6A:
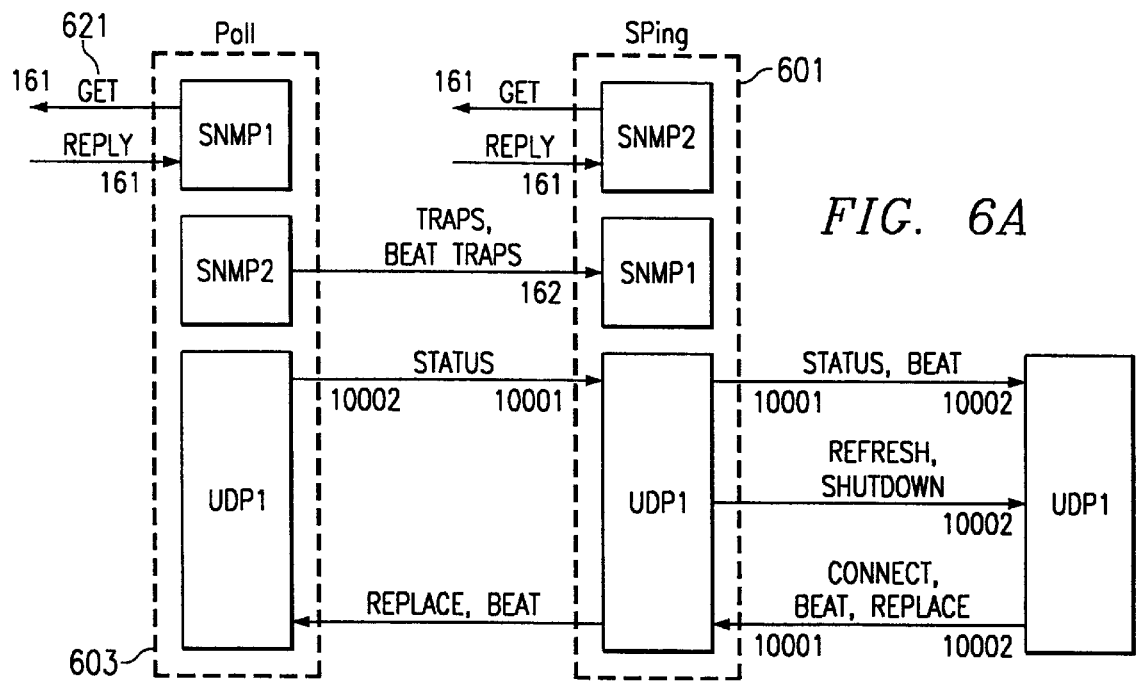
FIG. 6A is an overview of a port usage and data access of a preferred embodiment.

Referring to FIG. 6A, poller module 603, which represents either poller module 503A and 503B in FIG. 5, is designed to send out SNMP inquiries known as Get Requests 621. SNMP Get Request 621 asks for data from an SNMP Agent. The vast majority of network devices produced today contain SNMP Agents, which are designed to answer SNMP Get Requests, such as SNMP Get Request 621. FIG. 6A shows all of the communication ports and data channels for some of the specific modules shown in FIG. 5. Most modem network devices are controlled by on-board microcomputers running a limited version of an operating system and applications. Typically, the applications are very specific to that particular network device. On such application that is commonly implemented on most modem communications devices is an SNMP agent. The SNMP agent is a portion of the software, running on a network device, that is responsible for answering requests for information from network management applications. The requests come into the network devices, as an SNMP Get Requests 621.

Figure 6B:
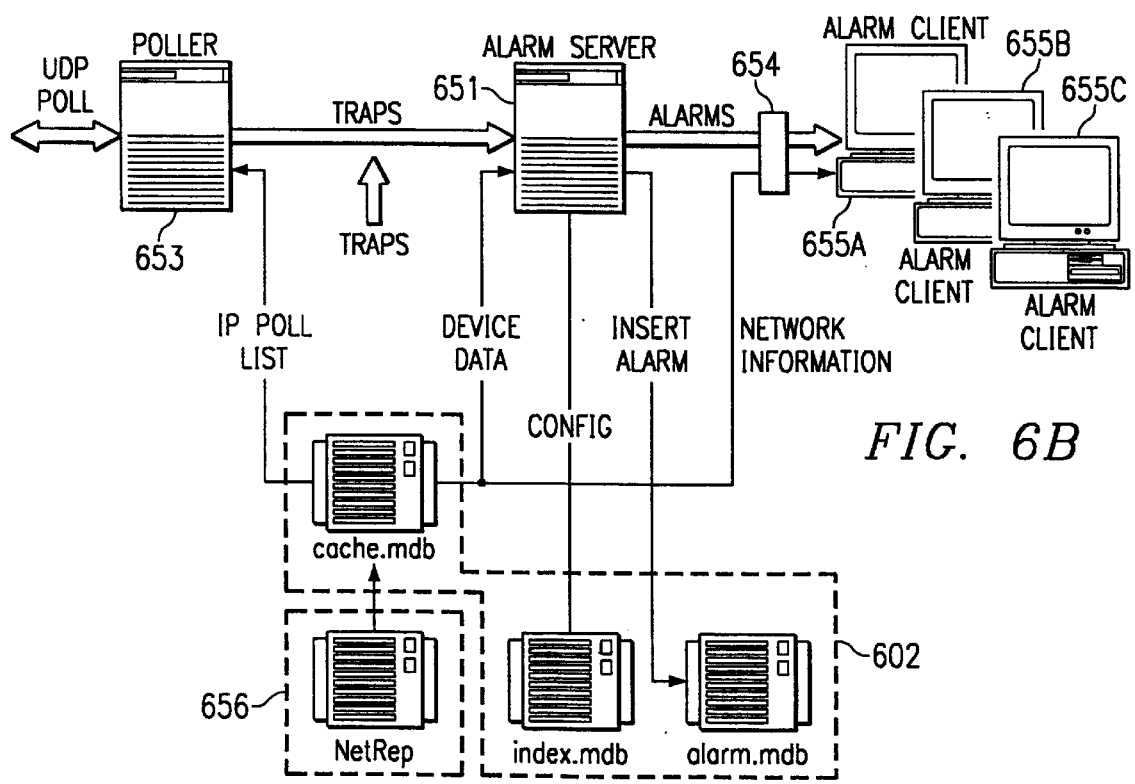
FIG. 6B is an overview of an equipment configuration of a preferred embodiment.

FIG. 6B shows the hardware configuration of a preferred embodiment, comprising polling module 653, server module 651, display module 654, and clients 655A, 655B, and 655C. Server module 651 accesses tools applications module 602, which accesses the following files, "cache.mdb,"

"index.mdb," and "alarm.mdb," all of which communicate local data, and also access database module 656, since FIG. 6B shows the hardware configuration for some of the specific modules shown in FIG. 5. The index file, "index.mdb," stores user account information including authentication password and user preferences. The cache file, "cache.mdb," stores information pulled from the OSS NetRep database 506. This information is used every time an alarm is written to the alarm database, "alarm.mdb." The information contains externally relevant data about the failed device, such as customer name, location, telephone numbers.

Polling Module

Polling module 603 in preferred embodiments sends out SNMP Get Request 621 and tracks the responses, shown as a "reply" in FIG. 6A. Each network device (most are known as routers) of a customer network 530A or 530B (in FIG. 5) typically possesses one or more interfaces. Polling module 603 polls each interface 51A–511C or network 509A and 511D–511G of network 509B separately and reports each interface's status separately to server module 501. A logical diagram of this process is shown in FIGS. 7A–7E. Because SNMP packets travel over the same communications lines as the customer data, SNMP packets are subjected to the same conditions as the customer data. As a result, network outages as well as network degradation are detected.

A major problem in sending a large volume of SNMP Get Requests 621 is the time required for each separate SNMP Get Request 621 to travel to and from the device and the time required for SNMP Agents on the device to formulate the reply. As a result, polling module 503A or 503B (in FIG. 5) must keep track of which SNMP Get Requests 621 are outstanding and at some time must determine and declare which SNMP Get Request 621 were not received.

Referring to FIGS. 7A, 7B, 7C, 7D, and 7E, preferred embodiments address this problem by dividing the requests which need to be sent out to interfaces 511A–511G by poller 503 to poll interfaces 511A–511C and 511E–511G into a plurality of batches or queues stored in outbound register 703A. These batches are organized into groups of fifty (50) requests each. Multiple batches 703A–703Y can be organized. Consequently, preferred embodiments have a total of twenty-five (25) queues in outbound registers 703A–703Y to store these groups of fifty (50) requests for a total capacity of 1250 outstanding requests at any given time.

Entries (representing interfaces to be checked) are selected from the list, in succession, and an SNMP Get Request 707, one for each interface to be polled, is sent out with a target network address specified in the list. After each IP address is used to send a SNMP Get Request 707, that specific IP address is placed in a queue stored in outbound registers 703A–703Y via paths 705A–705Y for later comparison. One of the parameters in the SNMP Get Request is an index ID. This is a user set number that identifies the request. Network devices reply to the request with the same ID in the reply packet, which is later stored in receive index registers 719A–719Y.

The transmission of entries 707 takes place at regular intervals, as does the corresponding receipt of responses 709 and 711 to entries 707. This method of sending requests provides for a network load that is generally constant in time. When the outbound register queue 703A has been filled with fifty (50) entries, a timer 715A is started. The customary interval for the timer is 8000 mS.

Asynchronously, network devices or interfaces reply to the SNMP Get Requests 707. Replies from network devices or interfaces are generally comprised of two portions, one portion of which is stored in receive registers 717A–717Y, namely 709A–709Y, and another portion of which is stored in receive index registers 719A–719Y, namely 711A–711Y. Thus, each reply packet causes an entry in specific receive register 719 as well as in specific receive index register 721. Receive registers 717A–717Y get the IP address from received index registers 719A–719Y and the specific receive Index register actually gets the index from received packet.

Requests can be coming in for any queue that is currently in use, A queue is deemed in use if there is at least one entry in the outbound queue and the timer has not expired for that queue. The parallel operation of the poller is demonstrated in its ability to receive responses for any in use queue. Thus, preferred embodiments effectively wait in parallel with one another by keeping track of outstanding polling queries separately from the responses received to outstanding polling queries. The use of outbound registers 703A–703Y, receive registers 717A–717Y, and receive index registers 719A–719Y effectively implement this ability.

When respective timer 715A–715Y expires, information found in receive registers 717A–717Y are compared to corresponding information found in outbound registers 703A–703Y to determine which interfaces did not respond. All network device interfaces that did respond are placed in reachable list 723, all others in unreachable list 724, which is accessible by server 501 (in FIG. 5).

Figure 7A:
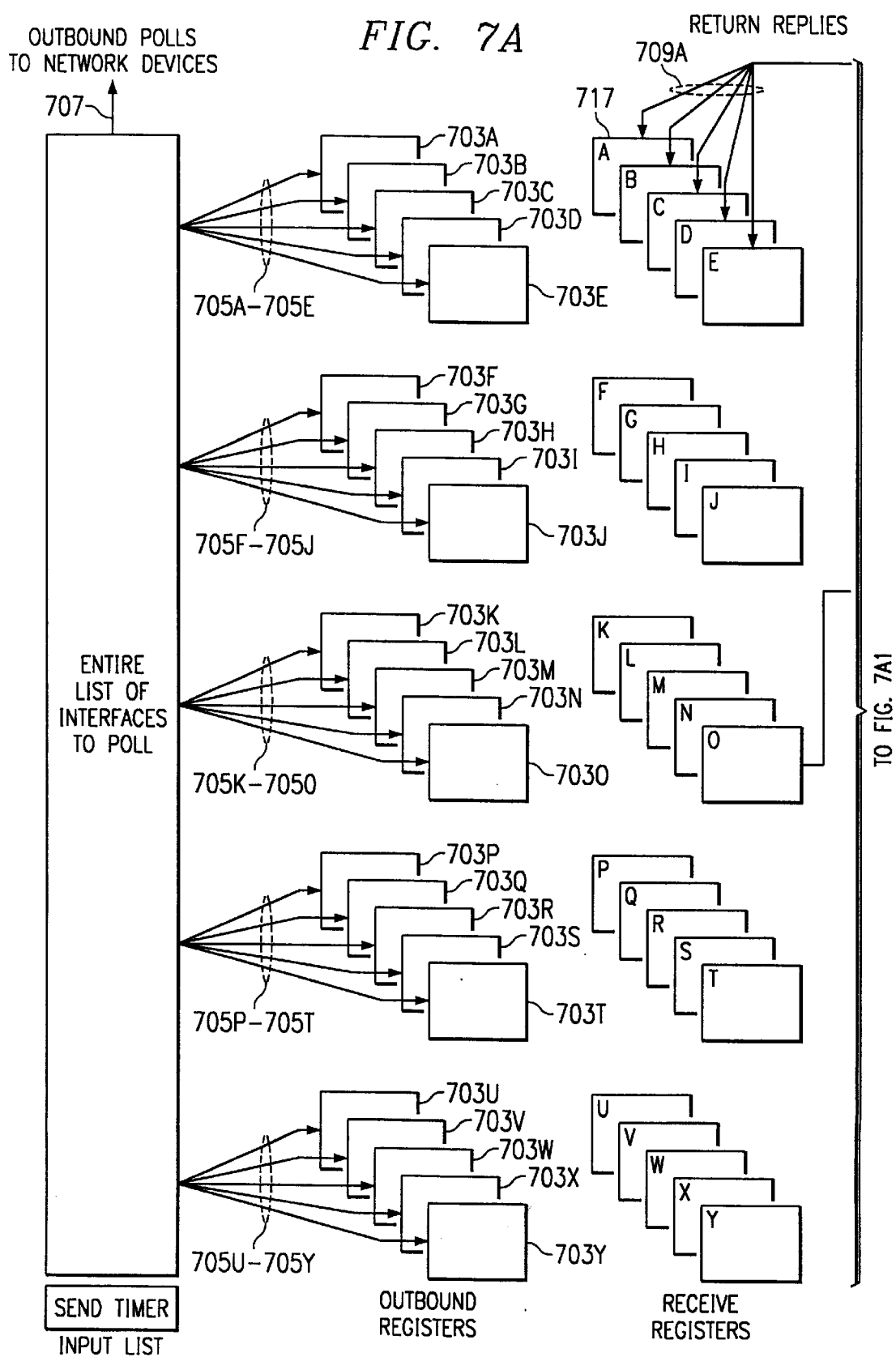

Note that all of the operations and data transfers (represented by lines) are not shown in FIG. 7A, given the fact that the sheer number of lines would make it very difficult to view anything. Rather, a specific example of the preferred polling procedure used for a smaller number of interfaces, outbound registers, receive registers, receive index registers, and difference registers is shown in FIGS. 7B and 7C, which is easily expanded to the degree shown in FIG. 7A.

Referring to FIG. 7B, when poller 503 (in FIG. 5), represented by input module 701 in FIG. 7B sends out an SNMP Get Request 751 to poll interface 761 of network 713, input module 701 stores information concerning interface 761 in record 781 of outbound register 703A via communication link 705A simultaneously or in close proximity in terms of time; when poller 503 (in FIG. 5), represented by input module 701 in FIG. 7B sends out an SNMP Get Request 752 to poll interface 762 of network 713, input module 701 stores information concerning interface 762 in record 782 of outbound register 703A via communication link 705A simultaneously or in close proximity in terms of time; when poller 503 (in FIG. 5), represented by input module 701 in FIG. 7B sends out an SNMP Get Request 753 to poll interface 763 of network 713, input module 701 stores information concerning interface 763 in record 783 of outbound register 703A via communication link 705A simultaneously or in close proximity in terms of time; when poller 503 (in FIG. 5), represented by input module 701 in FIG. 7B sends out an SNMP Get Request 754 to poll interface 764 of network 713, input module 701 stores information concerning interface 764 in record 784 of outbound register 703A via communication link 705A simultaneously or in dose proximity in terms of time; and when poller 503 (in FIG. 5), represented by input module 701 in FIG. 7B sends out an SNMP Get Request 755 to poll interface 765 of network 713, input module 701 stores information concerning interface 765 in record 785 of outbound register 705 via communication link 705A simultaneously or in close proximity in terms of time.

Each get request is given a unique index. When SNMP Agent replies to an individual SNMP Get Requests 751–755 (in FIG. 7B), SNMP Agent includes the index of the request packet in the reply packet. As stated above, although information found in a response from interfaces 761–764 is shown being stored in both receive register 717A and receive index register 719A in FIG. 7B, only one response is actually received by poller 503 (in FIG. 5). The reply packet is directed back to the requestor, which is, in preferred embodiments, poller module 503 (in FIG. 5). Each poller module 503A or 503B determines with the Modules (arithmetical function) function the location of the queue to track the receipt of the reply.

Queue Number=(Index of Current first item−Index of return item) Mod 50

In particular, referring to FIG. 7B, interface 761 responds to SNMP Poll Request 751 by storing some information in receive register 717A in record 791 via communication link 709A and index information in receive index register 719A in record 741. Interface 762 responds to SNMP Poll Request 752 by storing some information in receive register 719A in record 792 via communication link 709A and index information in receive index register 719A in record 742. Interface 763 responds to SNMP Poll Request 753 by storing some information in receive register 717A in record 793 via communication link 709A and index information in receive index register 719A in record 743. Interface 764 responds to SNMP Poll Request 754 by storing some information in receive register 717A in record 794 via communication link 709A and index information in receive index register 719A in record 744. Note all interfaces may not respond, such as interface 765 is shown not responding to SNMO Poll Request 755, which would then be repolled by poller 503 (in FIG. 5) and, if still unresponsive, repolled by server 501 (in FIG. 5). Timer 715A is initiated to measure a first time period $t_1$ moment that information concerning the information 785 is stored in record 785 of outbound register 703A, which generally pertains to the last SNMP poll request sent out in a batch, to a set amount of time, such as 8000 ms. Most responses to SNMP poll requests are received very quickly, so a first time period of 8000 ms should provide more than enough time for an interface to respond. Note multiple timers 715A–715Y are actually used in preferred embodiments, as shown in FIG. 7A, as an independent timer needs to be initiated when each independent outbound register 705A–705Y is filled.

Referring to FIG. 7C, once the first time period has elapsed, as measured by timer 715A, preferred embodiments of poller 503 then compare the list of interfaces for which responses are received (or not received) with the list of interfaces for which polling queries, SNMP requests, were sent out, using the index information found in receive index register 719A to determine which interfaces 761–765 have responded and which have not. The index information found in receive index register 719A is used to count or progress through both outbound register 703A and receive register 717A to correlate information concerning each interface 761–765. Information concerning whether a response was received and, thus, whether the specific interface failed is stored in difference register 721A and ultimately transferred to either a queue or listing of reachable interfaces 723 (in FIG. 7A) or unreachable interfaces 724 (in FIG. 7A). As discussed above, the list of unreachable interfaces is transferred to or accessible by server 501, so that server 501 is able to determine which interfaces need to be repolled.

Since it is not sufficient to poll only 1250 interfaces from a single poller module 503A or 503B (in FIG. 5), polling queues must be reused. The reuse of the queues proceeds in a sliding window. As time progresses, each queue is filled with a record of the 50 requests to be tracked by that polling queue. When the queue is full (50 entries), at least one timer, such as timers 715A–715Y, is started. Preferred embodiments use one timer for each queue 25. The timer expires in 8000 ms, which is configurable, and a function compares the received entries with the sent entries. If an entry is not received, it is placed in a queue to be polled again. After a complete iteration of the list, all entries that were not received on the first round are then polled again. If the entry replies on the second poll, the entry is returned to the poll list and is polled on the next full iteration. If the entry fails to reply on the second poll, a message is generated and forwarded to server module 501.

Figure 7D:
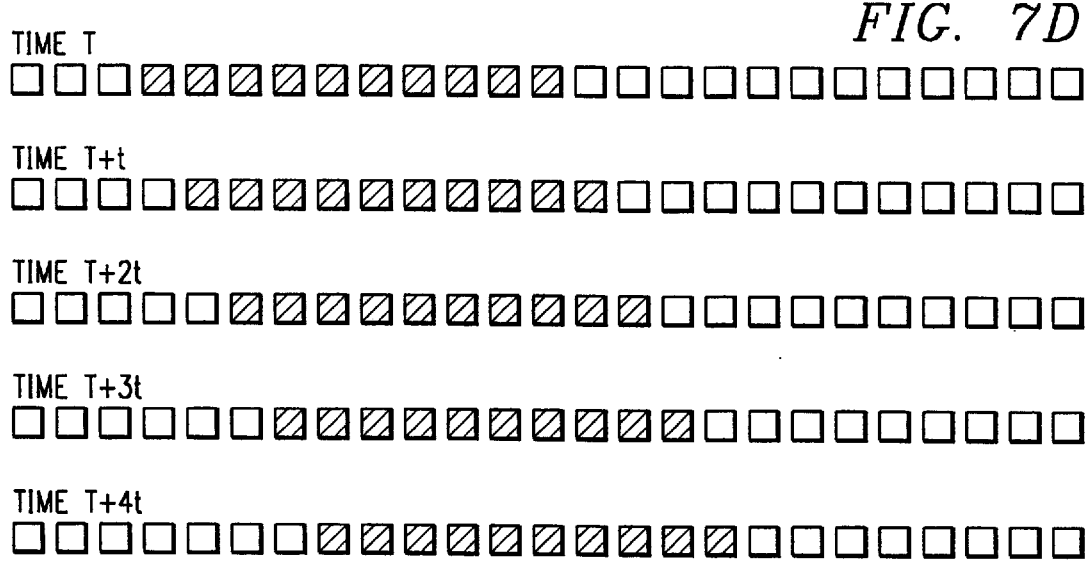

Since the number of items to be polled is frequently greater than the capacity of the 25 queues or 1250 items, the queues must be reused. FIG. 7D is a diagram that has one marker for each queue. When the first get request is sent (and the first IP address is added to the outbound register), the marker is darkened to indicate that the queue is in use. When the timer expires for that queue and the check has been performed, the results are posted and the queue is cleared. The marker is turned transparent to indicate the queue is available. Consequently, as shown in FIG. 7D, the use of the queues proceeds in a 'sliding window' fashion. The queues are reused as many times as required to poll the entire list.

As a side note, as stated above, poller module 503 preferably checks unreachable interfaces twice before sending a message to the server. To do this, poller 503 actually has two phases of a poll cycle, Phase A and Phase B. The first phase, Phase A, takes place as stated above. At the end of the Phase A poll cycle, poller 503 saves the list of reachable interfaces and loads the unreachable interfaces into the outbound list. The same procedure is performed in Phase B. The only difference is that at the completion of Phase B, any interfaces in the unreachable list are sent to the server for investigation, and possibly, alarm generation.

Figure 7E:

Referring to FIG. 7E, the same diagram is shown representing queue use. The difference between the two is that the second one shows queue use for a system that has a higher poll rate.

There is a relationship among the following: (i) the poll rate or interval between polls (the inverse of rate is Interval); (ii) the wait interval (currently discussed as 8000 mS); and (iii) the number of queues in use. This is logical since filing the queues at a faster rate, and emptying them at the same rate would result in more queues being in use at any given time.

The system must be operated in a way that there is no overlap in queue use. In other words, all queues may be in use at the same time, but the rate cannot be so high that an in use queue is used for polls before the previous use is cleared.

As a final note, there is a mechanism that removes entries from the list and generates SNMP Get Requests. The mechanism is also a timer. Every time the interval on this timer expires, N entries are removed from the list and used in succession to generate SNMP Get Requests.

Typical values are in the range of 50 mS for the interval and a value of 3 for N. This means that every 50 mS, three (3) SNMP Gets are sent. Lowering the interval or raising the value of N will cause the list to be emptied at a higher rate and therefore cause the poll rate to increase and the number of queues in use to be increased.

An implementation of the queue architecture can utilize only one queue, or many more than 25, depending on the amount of memory on the host computer. The current implementation utilizes 25 queues.

Server Module

Server module 501 performs several functions including that of controlling the entire system. Server module 501 is responsible for maintaining the state of the overall tools application module 502 in terms of what clients are in an alarm condition and which clients are not, which, among other things, includes updating "alarm.mdb" file (shown in FIG. 6B). In addition to other functions, server module 501 contains the Test Point for checking out interfaces forwarded by poller modules 503A or 503B.

As explained above, on receipt of an alarm message from either poller module 503A or 503B, server module 501 sends the interface to a Test Point. The Test point is a name for a special set of queues that reside in server 501. The function of the queues is to verify that poller module 503 was correct in declaring that the specific interface on customer networks 509A or 509B has failed. Poller module 503 operates at a maximum speed to check as many interfaces 511A–511C and 511D–511G as possible in as little time as possible. This speed can, in some instances, cause dropped packets and the appearance of a failed interface. To guard against this, the Test Point operates at a slower pace. Then polls are sent from the Test Point, separated by 1 second each, the response to which provide a "final opinion" as to the operational status of an interface. In particular, in the Test Point, server module 501 sends out a certain number (i.e., ten) of additional, successive SNMP Get Requests, separated by a certain time period (i.e., one second). And, if a certain amount (i.e., seven or more) of the requests are answered with replies, server module 501 formulates a message to the responsible poller module 503A or 503B and the interface is placed back into the poll list. And, if a certain amount (i.e., six or fewer) of the replies are received, server module 501 generates an alarm.

The process of generating an alarm includes inserting a record into the alarm table ("alarm.mdb" in FIG. 6B) on server module 501 and formulating and sending out messages to display modules 504A or 504B announcing that the alarm was created and transmitting the pertinent alarm data in an IP Datagram. Pertinent alarm data includes customer name, site location, failure description, telephone information, etc., as shown in the example message above.

Before the alarm condition is actually communicated to the client via display modules 504A or 504B and the alarm record is inserted into database module 506, server module 501 correlates information from the cache file ("cache.mdb" in FIG. 6B) with information concerning the interface IP address that is failing. Technically, the two files, "cache.mdb" and "alarm.mdb" in FIG. 6B are "joined" in that the records found in each file are associated with one another. This correlation is crucial to resolving the problem identified by the alarm. Without the additional data, the alarm would simply be a message that a specific IP address, such as 10.1.1.1, is not reachable. There would be no indication of the location of the device in terms of City or State. There would be no information available to help resolve the problem.

Server module 501 also correlates the specific alarm condition with group and team data. In order for the users of preferred embodiments to manage a large number of customer devices, alarms must be divided into categories so that the problems can be distributed to multiple network engineers. The mechanism chosen to do that involves assigning a group and team to a customer network. Any alarms that are generated for that customer are given that group and team assignment. The group and team assignments are used by display modules 504A or 504B to decide where to send the messages.

Tools Applications Module

In order to operate, preferred embodiments must have a list of IP addresses to poll and must be able to associate data with the IP Addresses. This data comes from database 506, which, as discussed above, is preferably an Oracle™ database, also known as OSS. Database module 506 contains information about our customers and their devices. Areas in the database are also named, and the area that supplies the information used by preferred embodiments is also known as "NetRep."

Tools application module 514 transfers data from OSS NetRep to server module 501. During the NetRep load process, data is transferred from the Oracle™ database to a local file on server module 501, known as the cache table or "cache.mdb" in FIG. 6B. This table is so named because it functions as a cache, or ready access, for the required data. The cache is necessary because of performance problems with remotely accessing the Oracle™ data in real-time.

Display Module

Display modules 504A and 504B conduct the following activities: (i) broker messages; (ii) filter Alarms; and (iii) select the current alarms for Client Initialization. With respect to the broker message function, display module 504A and 504B distribute alarm messages to each of the attached clients 505A–505F and 505G–505L. Display modules 504A and 504B distribute the load of relaying the messages to a large number of clients. Each display module 504A and 504B can accommodate as many as sixteen (16) clients, and there can be as many as sixteen (16) display servers 504A or 504B.

Display modules 504A and 504B also filter the alarm signals. Each client 505A–505F and 505G–505L has the ability to specify the group and team for which they want to receive alarm information. Display modules 504A and 504B decide for each message received from server module 501, if the alarm should be forwarded to any particular client 505A–505F and 505G–505L, based on the choice of group and team.

Display modules 505A and 504B also select each client to be initialized, using the process shown in FIG. 9D. Since network engineers may initiate a client at any time, preferred embodiments must be able to preserve the current state of the all monitored interfaces (reachable or unreachable) and must be able to transmit on startup the interfaces that are currently down. Each client 505A–505G and 505G–505L can send is a request for the current state. On receipt of this request, display module 504A or 504B selects from the alarm table all alarms with a code of less than 2000. Currently, the codes on alarms are as follows:

0 1000 New alarm (interface is now unreachable)

0 2000 Cleared alarm (interface is now reachable)

0 4000 Unmanaged interface (clears alarm and stops further polling)

The space between the codes is intended for future features. This mechanism represents the ability of the system to preserve the current state. The alarm database contains a record of all alarms that have occurred and a record of all alarms that have cleared. In addition, since it contains all alarms, it also contains a list of alarms that have occurred, but have not been cleared. In this way, it also keeps a record of the current state of all devices being monitored. To determine the list of devices currently in a failed state, select from the table all alarms that have not been cleared. To be cleared, an alarm must be paired with a message that states the failed device is operating properly again. The current state of the managed network state is represented by a description of which interfaces are failed and which are not. The state is preserved in the non-volatile memory of the database file.

Client Applications Modules

Figure 10A:
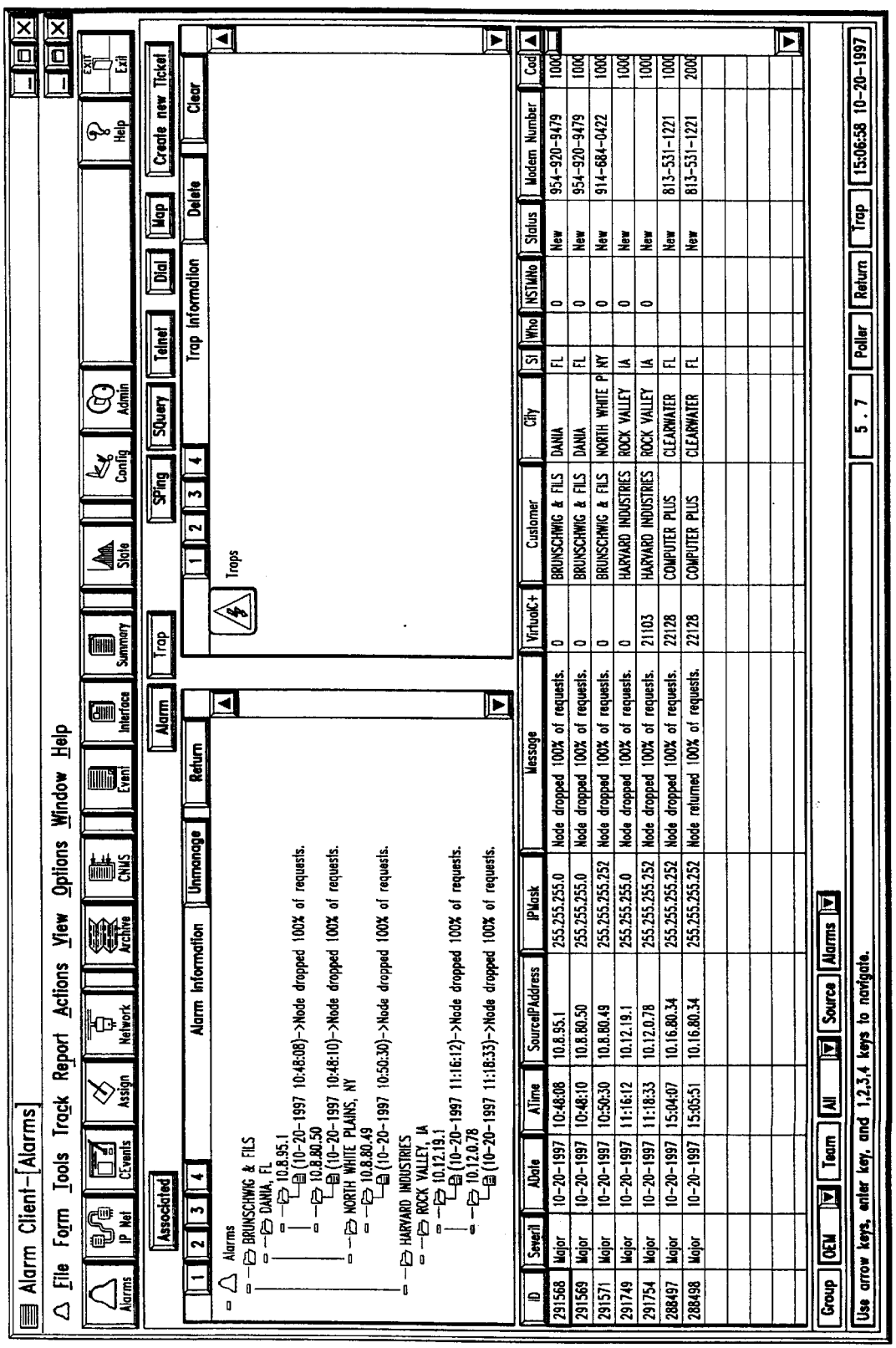
FIG. 10A is typical client screen provided by a preferred embodiment, which is used to convey alarm information.
Figure 10B:
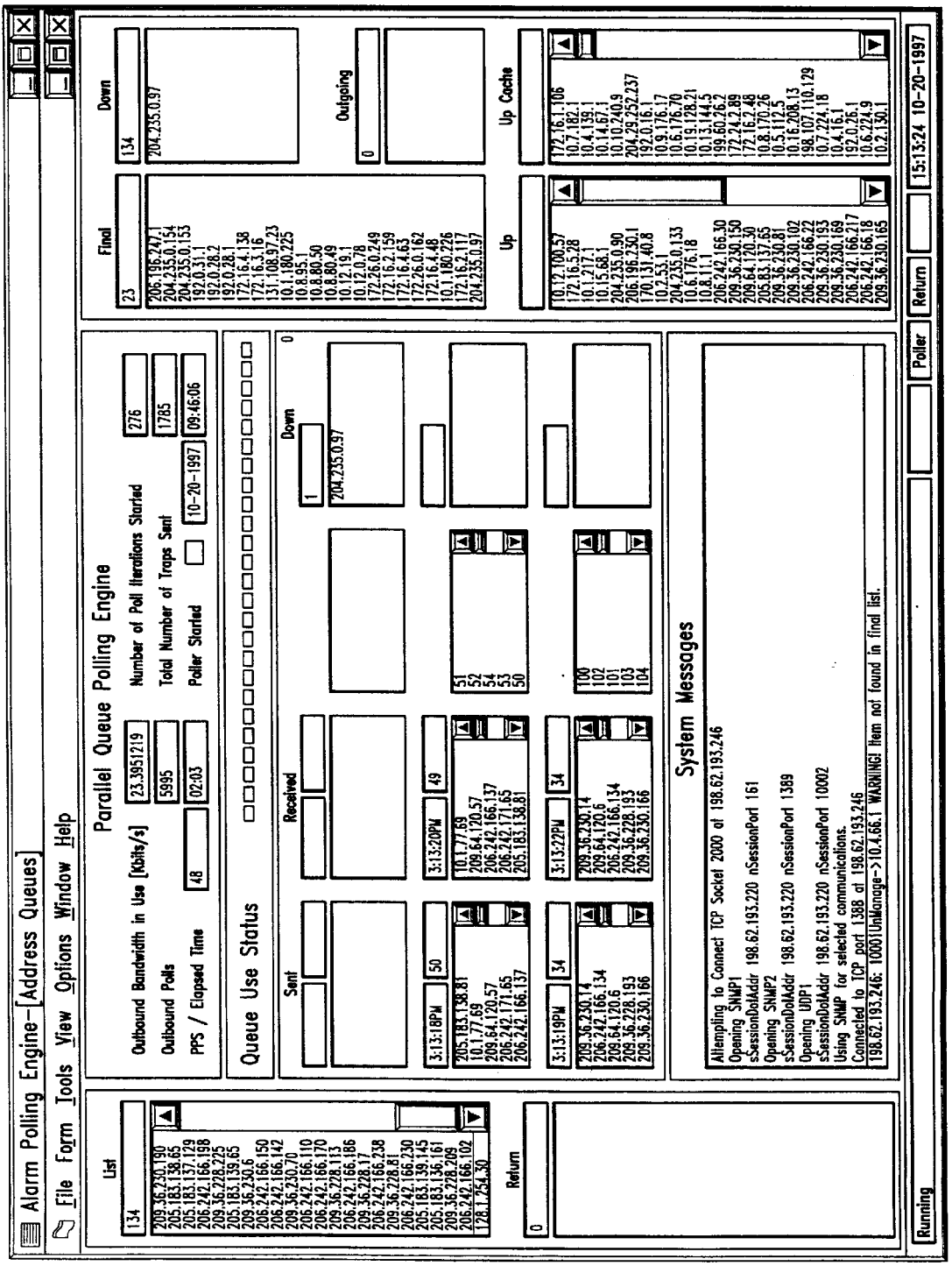
FIG. 10B is a main screen used by a preferred embodiment to relay information concerning SNMP Poll applications.
Figure 10C:
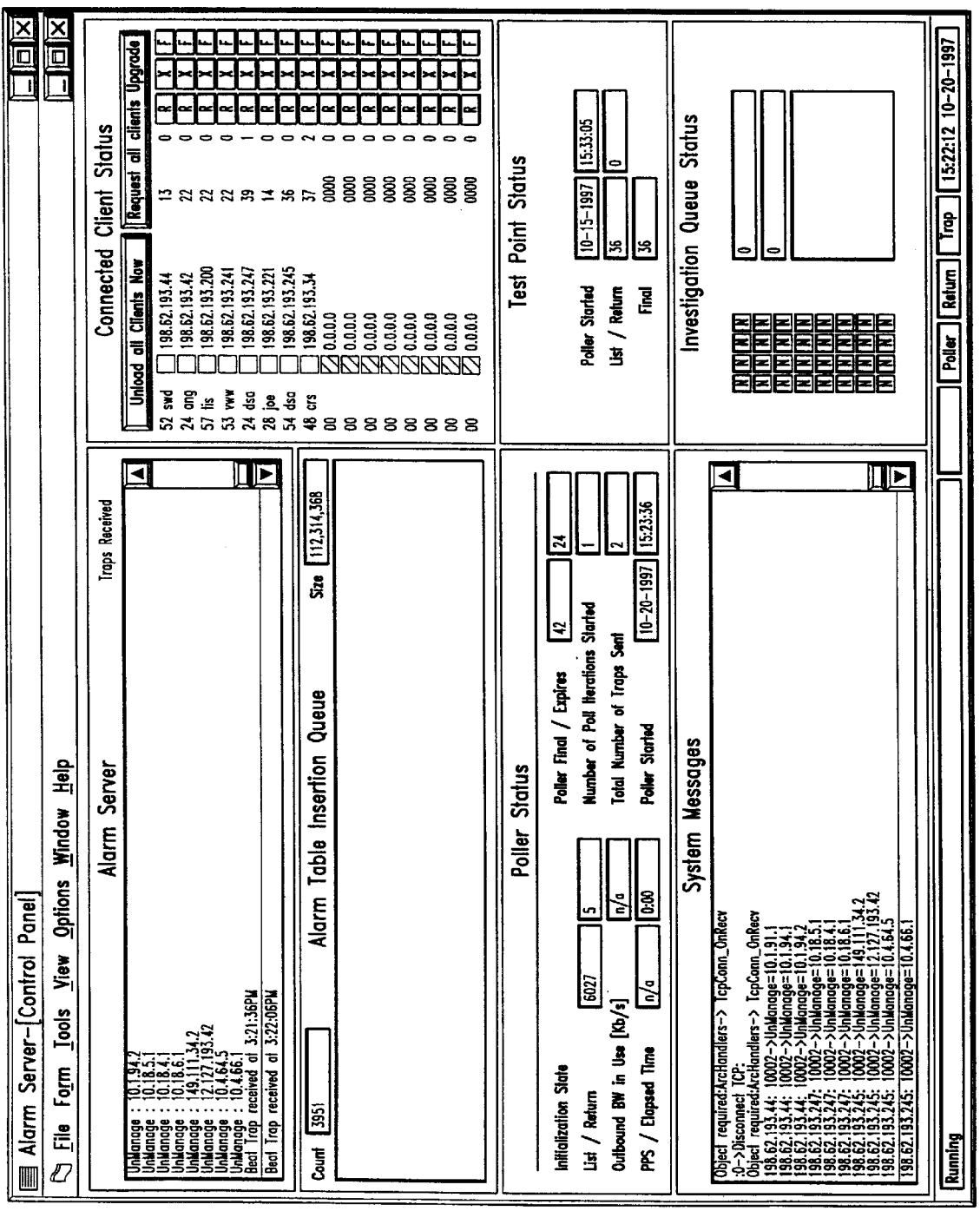
FIG. 10C is an example of a server screen provided by a preferred embodiment.

Information to client applications modules 505A–505F and 505G–505L is organized to (i) present status efficiently and communicate the current state of all managed customer devices and communicate what has just occurred to create the alarm condition (i.e., what has became reachable or unreachable?); (ii) provide information to help solve problems, not just report problems; and (iii) integrate tools needed to solve problems. In order to present status information, as shown in FIG. 10A, screens used in preferred embodiments employ a tree metaphor. All alarms are organized in the tree first by Customer, then by Location (City and State,) and then by IP address. In addition to relaying that an interface is no longer reachable, as shown in FIG. 10B, preferred embodiments present data that is necessary to help resolve the problem such as customer name, location, and contact information. Finally, with respect to the integration of tools, several common tools are integrated into displays provided to clients by preferred embodiments for convenience, as shown in FIG. 10C. For example, it is common to dial into a failed router with a modem. Preferred embodiments include a built in communications module. From any alarm, a button press brings up a dial session and dials the number to the failed device. Within seconds, a network engineer can work on solving the problem.

Further Modifications and Variations

Although the invention has been described with reference to a specific embodiment, this description is not meant to be construed in a limiting sense. The example embodiments shown and described above are only intended as an example. Various modifications of the disclosed embodiment as well as alternate embodiments of the invention will become apparent to persons skilled in the art upon reference to the description of the invention. For instance, alternate preferred embodiments can alter the amount or type of information that is related to the client application with an alarm signal. Also, please note that while the above discussion generally described electrical connections as "connections," or being directly and/or indirectly "connected," it should be noted that these connections may also be coupled electrically, optically, or electromagnetically (e.g., radio signals and wireless transmissions). While prewired hardwired systems could be designed and built implementing the above embodiments and may be used, software embodiments are preferred.

Thus, even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims. Accordingly, it should be understood that the modifications and variations suggested above and below are not intended to be exhaustive. These examples help show the scope of the inventive concepts, which are covered in the appended claims. The appended claims are intended to cover these modifications and alternate embodiments.

In short, the description and drawings of the specific examples above are not intended to point out what an infringement of this patent would be, but are to provide at least one explanation of how to make and use the inventions contained herein. The limits of the inventions and the bounds of the patent protection are measured by and defined in the following claims.

What is claimed:

1. A network monitoring system comprising:
    a poller operable to exchange messages with a plurality of interfaces of a plurality of network devices, the poller operable to communicate a first get message to the plurality of interfaces, to receive a reply message from each of the plurality of interfaces, and to generate an interface alarm message when an interface does not communicate a reply message back within a first time period;
    a database that includes information on the plurality of interfaces; and
    a server operable to receive the interface alarm message, and to communicate a second get message to the interface to verify that the interface is not responding, the server operable to generate a failed interface message, query the database to retrieve information on the interface, and to communicate the failed interface message and information retrieved from the database to a client application if the interface does not communicate a reply message back within a second time period.

2. The network monitoring system of claim 1, wherein the server is operable to send a third get message to the interface if the interface does not communicate a reply message back to the poller within a second time period, the server operable to generate the failed interface message and to communicate the failed interface message and information retrieved from the database to the client application if the interface does not communicate a reply message back within a third time period.

3. The network monitoring system of claim 1, wherein the server is operable to log information in the database related to the interface failing to communicate the reply message back to the poller within the second time period if the interface does not communicate the reply message back to the poller within the second time period.

4. The network monitoring system of claim 1, wherein the client application includes a display server operable to receive the failed interface message and the information retrieved from the database, generate a client application interface in response, and to communicate the client application interface to a client for display.

5. The network monitoring system of claim 4, further comprising:
    a plurality of clients operable to receive and display the client application interface.

6. The network monitoring system of claim 4, wherein the server and the client server are in a client/server relationship.

7. The network monitoring system of claim 1, wherein the client application includes a client application interface that includes active alarm information and historical information.

8. The network monitoring system of claim 7, wherein the historical information includes active alarm failure events and alarm clearing events.

9. The network monitoring system of claim 7, wherein the historical information includes network interface address information, physical location information, and contact information.

10. The network monitoring system of claim 7, wherein the active alarm information is presented in an hierarchical manner.

11. The network monitoring system of claim 10, wherein the hierarchy includes customer identification information, location information, network device information, and interface information.

12. The network monitoring system of claim 1, further comprising:
a second poller operable to exchange messages with a second plurality of interfaces of a plurality of network devices, the second poller operable to communicate a first get message to the second plurality of interfaces, to receive a reply message from each of the second plurality of interfaces, and to generate an interface alarm message when an interface does not communicate a reply message back within a designated time period.

13. The network monitoring system of claim 1, wherein the poller is operable to exchange messages with around 30,000 interfaces.

14. The network monitoring system of claim 1, wherein the poller is operable to exchange messages with at least 30,000 interfaces.

15. The network monitoring system of claim 1, further comprising:
a plurality of pollers each operable to exchange messages with a defined plurality of interfaces of a plurality of network devices, each poller operable to communicate a first get message to its defined plurality of interfaces, to receive a reply message from each of the defined plurality of interfaces, and to generate an interface alarm message when an interface does not communicate a reply message back within a designated time period.

16. The network monitoring system of claim 1, wherein the poller and the server are in a client/server relationship.

17. The network monitoring system of claim 1, wherein the messages exchanged between the network monitoring system and the plurality of interfaces use the Simple Network Management Protocol (SNMP).

18. The network monitoring system of claim 1, wherein the database includes a list of interfaces that identifies the plurality of interfaces.

19. The network monitoring system of claim 1, wherein the database is operable to store information related to failed interfaces.

20. The network monitoring system of claim 1, wherein more than one interface of the plurality of interfaces may be associated with one network device of the plurality of network devices.

21. The network monitoring system of claim 1, wherein the plurality of network devices may be part of one or more different networks.

22. The network monitoring system of claim 1, wherein the interface alarm message identifies the interface that did not respond.

23. The network monitoring system of claim 1, wherein the poller is operable to communicate a first get message to the plurality of interfaces within a minute.

24. The network monitoring system of claim 1, wherein the poller is operable to communicate a first get message to the plurality of interfaces within ninety seconds.

25. The network monitoring system of claim 24, wherein the poller is send get messages to around 30,000 interfaces.

26. The network monitoring system of claim 1, wherein the poller is operable to communicate a first get message to the plurality of interfaces within a programmable period of time.

27. The network monitoring system of claim 1, wherein the number of pollers used in the network monitoring system is scalable.

28. The network monitoring system of claim 1, wherein the poller is operable to communicate a first get message to the plurality of interfaces at defined and successive intervals.

29. The network monitoring system of claim 1, wherein the database includes multiple tables.

30. The network monitoring system of claim 1, wherein the messages are exchanged using sockets.

31. The network monitoring system of claim 1, wherein the poller is operable to communicate the first get message to the plurality of interfaces in parallel.

32. The network monitoring system of claim 1, wherein the first time period and the second time period are the same.

33. A network monitoring system comprising:
a poller operable to exchange messages with a plurality of interfaces of a plurality of network devices, the poller operable to communicate a get message to the plurality of interfaces over a defined period of time and on successive occasions, to receive a reply message from each of the plurality of interfaces in response to each get message within a given period of time, and to generate an interface alarm message when an interface does not communicate a reply message back in response to the get message within the given period of time on a threshold number of occasions;
a database that includes information on the plurality of interfaces; and
a server operable to receive the interface alarm message generated by the poller, and to communicate a get message to the interface on successive occasions to verify that the interface is not responding, the server operable to generate a failed interface message, query the database to retrieve information on the interface, and to communicate the failed interface message and information retrieved from the database to a client application if the interface does not communicate a reply message back in response to the get message communicated by the server within a desired period of time on a predetermined number of occasions.

34. The network monitoring system of claim 33, wherein the threshold number of occasions is two consecutive occasions.

35. The network monitoring system of claim 33, wherein the threshold number of occasions is three consecutive occasions.

36. The network monitoring system of claim 33, wherein the threshold number of occasions is defined as seventy percent of the time.

37. The network monitoring system of claim 33, wherein the predetermined number of occasions is defined as seventy percent of the time.

38. The network monitoring system of claim 33, wherein the predetermined number of occasions is defined as sixty percent of the time.

39. The network monitoring system of claim 33, wherein the predetermined number of occasions is six or fewer occasions in ten attempts.

40. The network monitoring system of claim 33, wherein the server is operable to communicate a message to the poller indicating that an interface is not responding if the interface does not communicate a reply message back in response to the get message communicated by the server within a desired period of time for a predetermined number of occasions.

41. The network monitoring system of claim 33, wherein the server is operable to communicate a message to the database indicating that an interface is not responding if the interface does not communicate a reply message back in response to the get message communicated by the server within a desired period of time for a predetermined number of occasions.

42. The network monitoring system of claim 33, wherein the server is operable to monitor a failed interface by periodically sending a get message to the interface and checking for a reply message.

43. The network monitoring system of claim 42, wherein the server is operable to generate a clear message once a failed interface begins to respond.

44. A method for monitoring network interfaces comprising:
communicating a first get message to a plurality of network interfaces;
determining whether a reply message was received from each of the plurality of network interfaces within a first time period;
generating an interface alarm message when an interface does not communicate a reply message back within the first time period;
receiving the interface alarm message and, in response, communicating a second get message to the interface;
determining whether a reply message was received in response to the second get message within a second time period;
generating a failed interface message, querying a database to retrieve information on the interface, and communicating the failed interface message and information retrieved from the database to a client application when the interface does not communicate a reply message back within the second time period.

45. The method of claim 44, further comprising:
storing information in the database related to the failed interface.

46. The method of claim 44, further comprising:
receiving the failed interface message and the information retrieved from the database and generating a client application interface.

47. The method of claim 46, wherein the client application interface includes active alarm information and historical information.

48. The method of claim 47, wherein the historical information includes active alarm failure events and alarm clearing events.

49. The method of claim 47, wherein the historical information includes network interface address information, physical location information, and contact information.

50. The method of claim 47, wherein the active alarm information is presented in an hierarchical manner.

51. The method of claim 50, wherein the hierarchy includes customer identification information, location information, network device information, and interface information.

52. A method for monitoring network interfaces comprising:
communicating a get message to a plurality of network interfaces on successive occasions;
determining whether a reply message was received from each of the plurality of network interfaces within a given period of time;
generating an interface alarm message when an interface does not communicate a reply message back within the given period of time on a threshold number of occasions;
receiving the interface alarm message and, in response, communicating a get message to the interface on successive occasions;
determining whether a reply message was received from the interface within a desired period of time;
generating a failed interface message and querying a database to retrieve information on the interface, and communicating the failed interface message and information retrieved from the database to a client application when the interface does not communicate a reply message back within the desired period of time on a predetermined number of occasions.

53. The method of claim 52, wherein the threshold number of occasions is two consecutive occasions.

54. The method of claim 52, wherein the threshold number of occasions is three consecutive occasions.

55. The method of claim 52, wherein the threshold number of occasions is defined as seventy percent of the time.

56. The method of claim 52, wherein the predetermined number of occasions is defined as seventy percent of the time.

57. The method of claim 52, wherein the predetermined number of occasions is defined as sixty percent of the time.

58. The method of claim 52, wherein the predetermined number of occasions is six or fewer occasions in ten attempts.

* * * * *